(12) United States Patent
Kubesh

(10) Patent No.: US 7,261,346 B1
(45) Date of Patent: Aug. 28, 2007

(54) TRUCK GUARD ASSEMBLY

(76) Inventor: Grant Kubesh, 146 R.D. #454, Glendive, MT (US) 59330

( * ) Notice: Subject to any disclaimer, the term of this patent is extended or adjusted under 35 U.S.C. 154(b) by 138 days.

(21) Appl. No.: 11/144,219

(22) Filed: Jun. 6, 2005

(51) Int. Cl.
*B60R 19/52* (2006.01)
(52) U.S. Cl. .................................. 293/115; 180/68.6
(58) Field of Classification Search ............... 293/115; 180/68.6; 296/26.08, 26.09
See application file for complete search history.

(56) References Cited

U.S. PATENT DOCUMENTS

| 2,189,169 | A | 2/1940 | Cox |
| 2,699,964 | A | 1/1955 | Hartung |
| 4,099,760 | A | 7/1978 | Mascotte et al. |
| 4,322,106 | A | 3/1982 | Nespor |
| 4,469,360 | A | 9/1984 | Drury |
| D308,957 | S | 7/1990 | Bennie |
| 5,277,465 | A | 1/1994 | Weir |
| D361,316 | S | 8/1995 | Orth, Sr. et al. |
| 5,683,128 | A | 11/1997 | Heyns |
| 5,779,289 | A | 7/1998 | Alexander, Jr. |
| 6,070,926 | A * | 6/2000 | Hardin ..................... 296/26.08 |
| 6,152,504 | A * | 11/2000 | Dickson et al. ............. 293/144 |
| 6,290,271 | B1 | 9/2001 | Geisler |
| 6,398,276 | B1 * | 6/2002 | Smith ......................... 293/115 |

\* cited by examiner

*Primary Examiner*—D. Glenn Dayoan
*Assistant Examiner*—Melissa A Black

(57) ABSTRACT

A truck guard assembly includes a semi-truck that has a front end and a pair of female hitch receivers is mounted on the front end and is spaced from each other. A shield apparatus includes a plurality of elongated members each having a first end and a second end. A plurality of connector bars is attached to each of the elongated members so that the elongated members are each orientated parallel to each other. A pair of connectors is configured to releasably attach the shield apparatus to the front end of the semi truck. Each of the connectors is attached to the shield apparatus and is positioned for engaging one of the hitch receivers.

7 Claims, 5 Drawing Sheets

TRUCK GUARD ASSEMBLY

BACKGROUND OF THE INVENTION

1. Field of the Invention

The present invention relates to truck guard devices and more particularly pertains to a new truck guard device for providing protection from impacts from large animals, other vehicles or other objects to a front end of a semi-truck.

2. Description of the Prior Art

The use of truck guard devices is known in the prior art. U.S. Pat. No. 4,099,760 describes a device for positioning on a vehicle which includes a brush guard and a utility rack. This device allows a vehicle to drive through relatively light brush and prevents damage to the vehicle from the light brush. Another type of truck guard device is U.S. Pat. No. 5,683,128 having a grill assembly that is removably attachable to the front end of a truck for preventing damage to the front end. Yet another such device is found in U.S. Pat. No. 6,290,271 that has a design adapted for positioning on a pick-up truck front end.

While these devices fulfill their respective, particular objectives and requirements, the need remains for a device that is configured for being removably positioned on a semi-truck for preventing damage to the front end of the semi-truck, particularly that damage from impacts with large animals such as deer. Additionally the device should incorporate a tilting means to allow a person to tilt the device away from the front end when a cab of the semi-truck must be lifted during engine maintenance.

SUMMARY OF THE INVENTION

The present invention meets the needs presented above by generally comprising a semi-truck that has a front end and a pair of female hitch receivers is mounted on the front end and is spaced from each other. A shield apparatus includes a plurality of elongated members each having a first end and a second end. A plurality of connector bars is attached to each of the elongated members so that the elongated members are each orientated parallel to each other. A pair of connectors is configured to releasably attach the shield apparatus to the front end of the semi truck. Each of the connectors is attached to the shield apparatus and is positioned for engaging one of the hitch receivers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
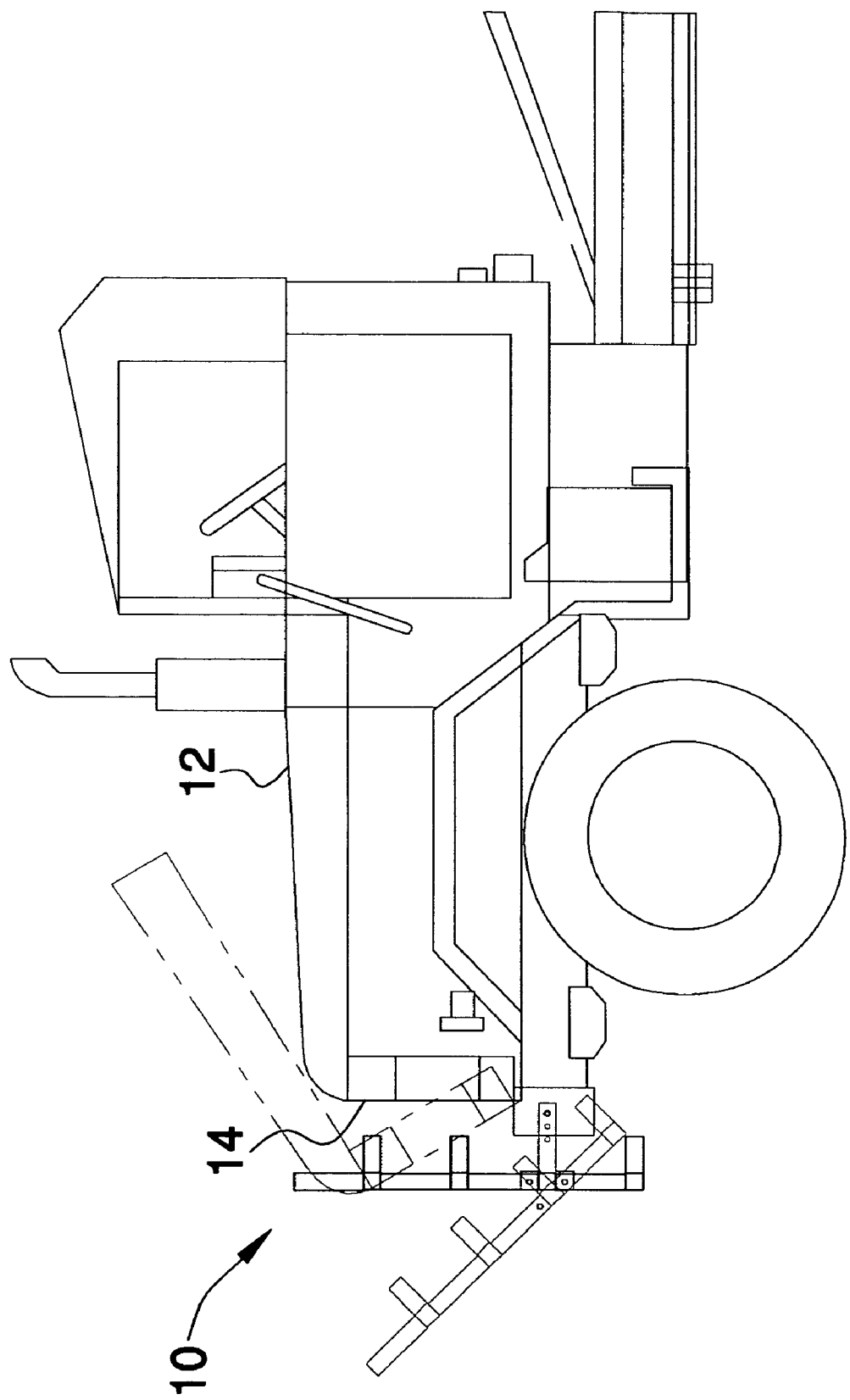
FIG. 1 is a side in-use view of a truck guard assembly according to the present invention.
Figure 2:
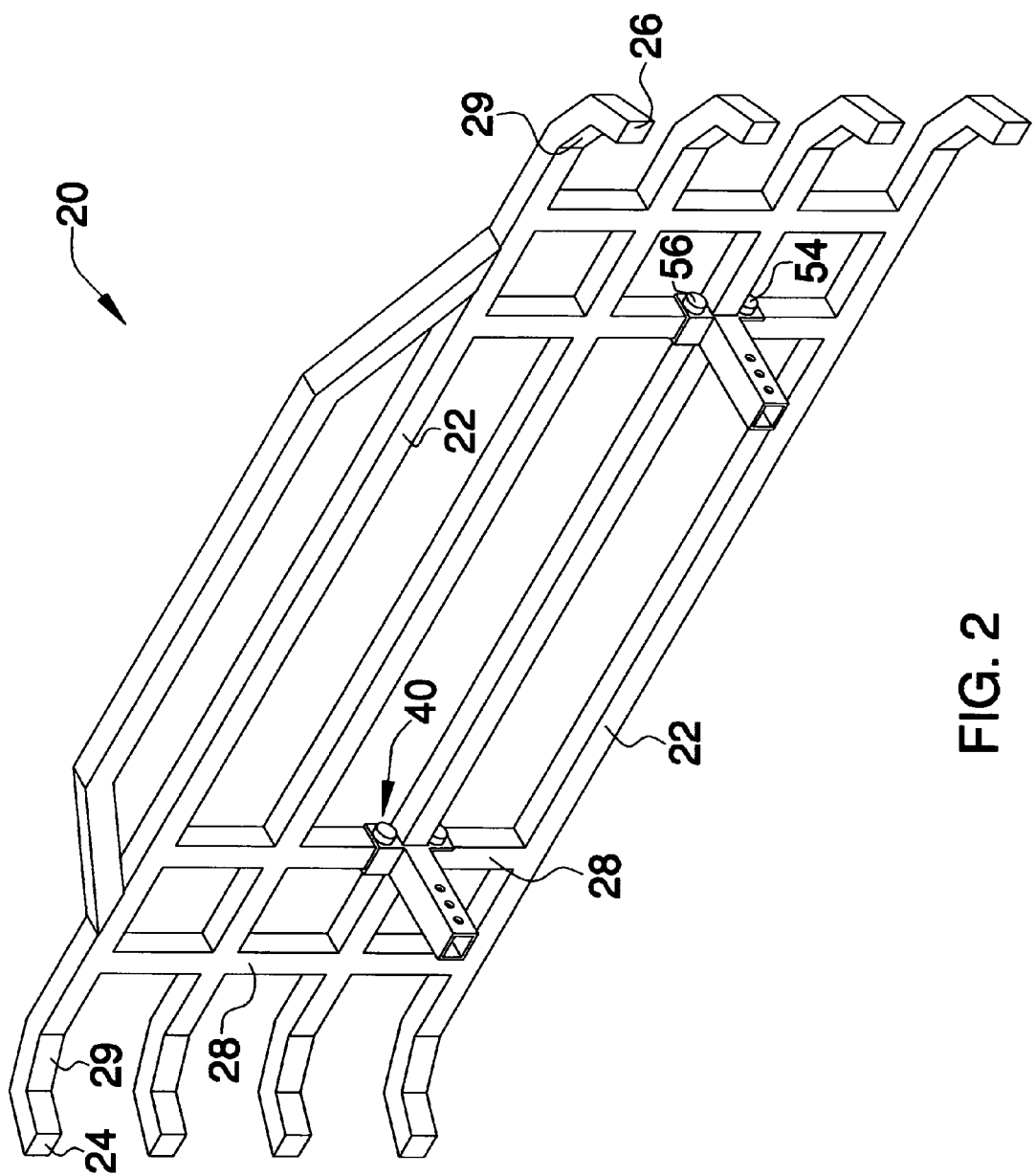
FIG. 2 is a perspective view of the present invention.
Figure 3:
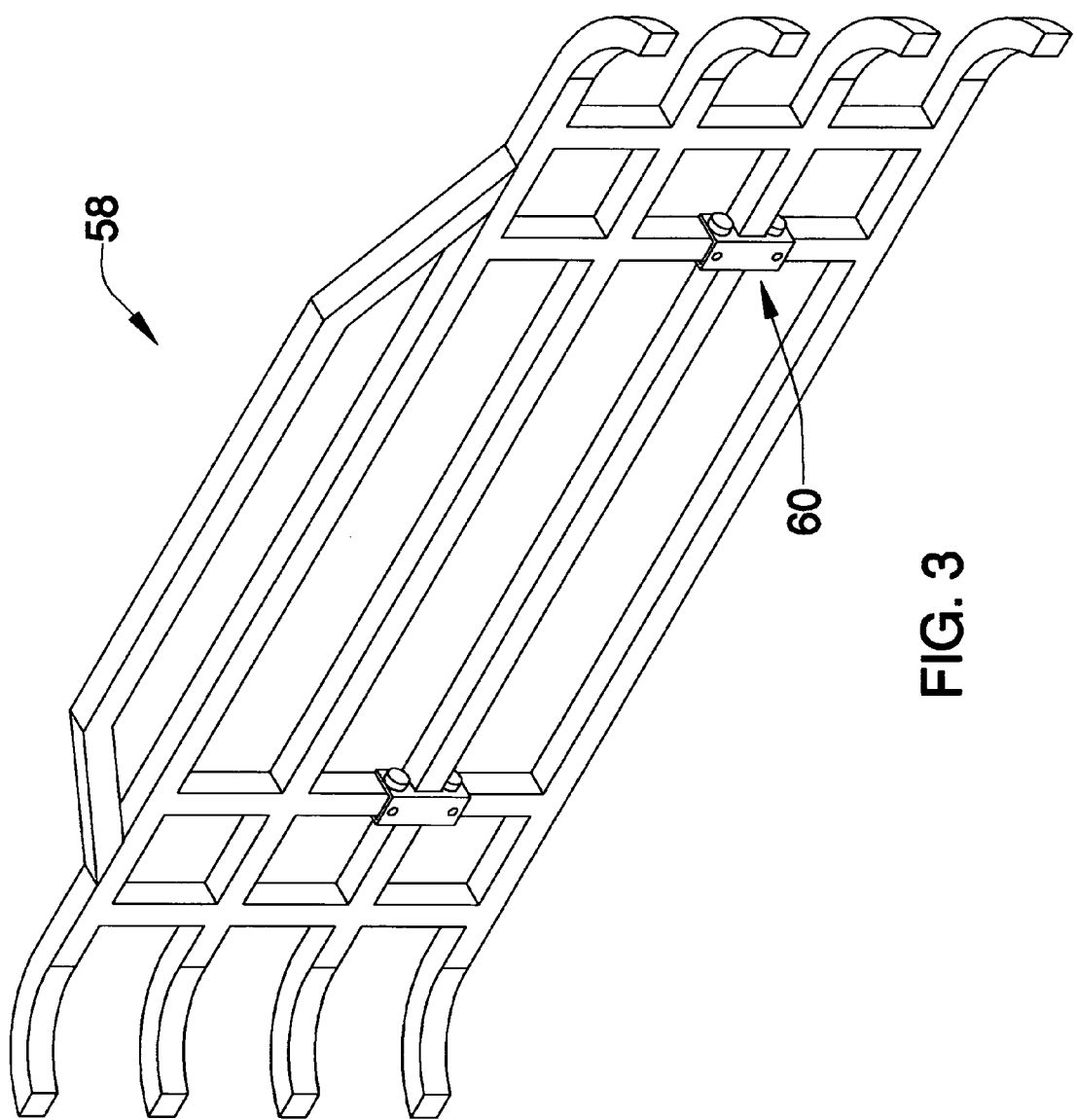
FIG. 3 is a perspective view of a second embodiment of the present invention.
Figure 4:
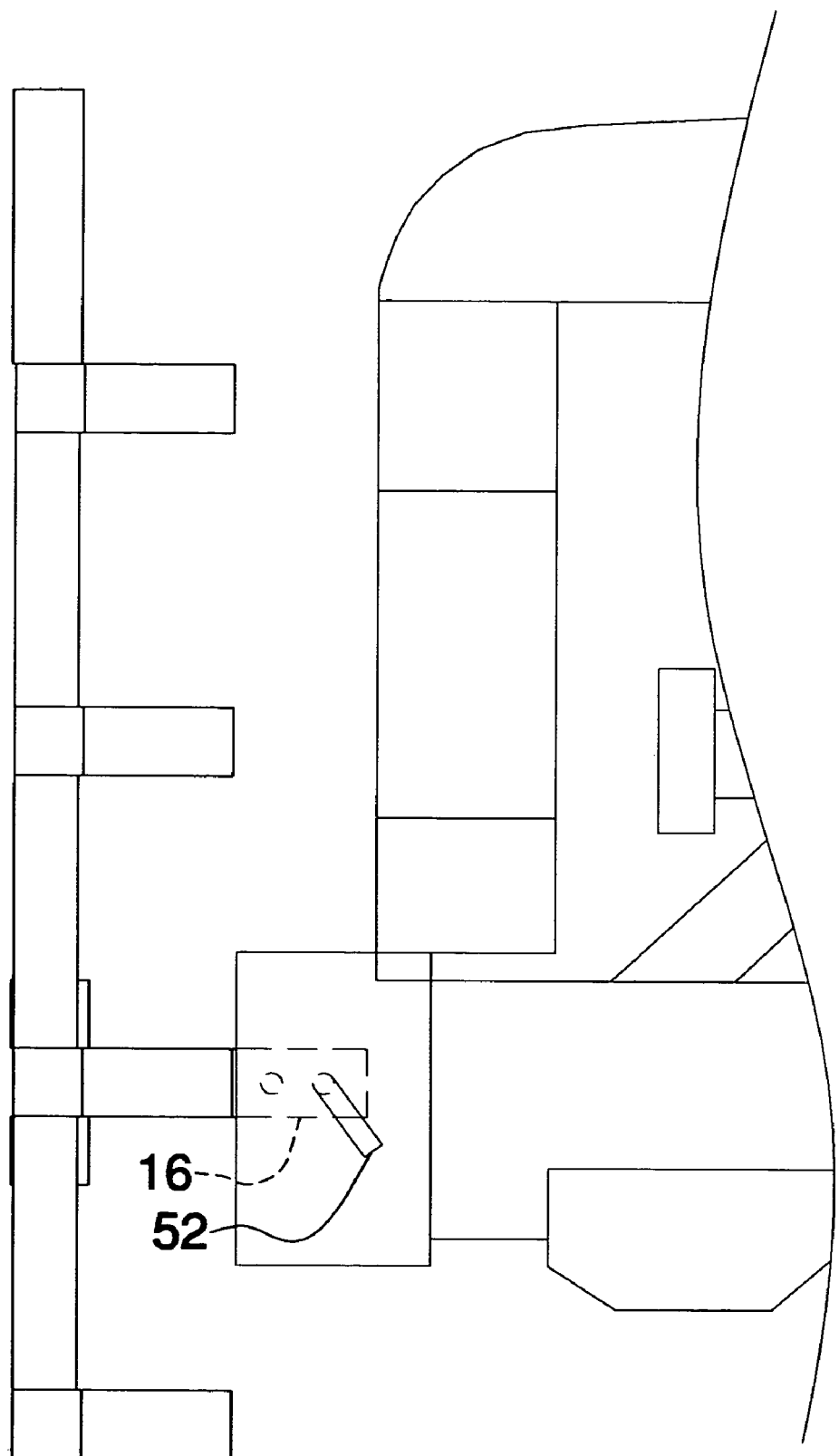
FIG. 4 is a side view of the present invention.
Figure 5:
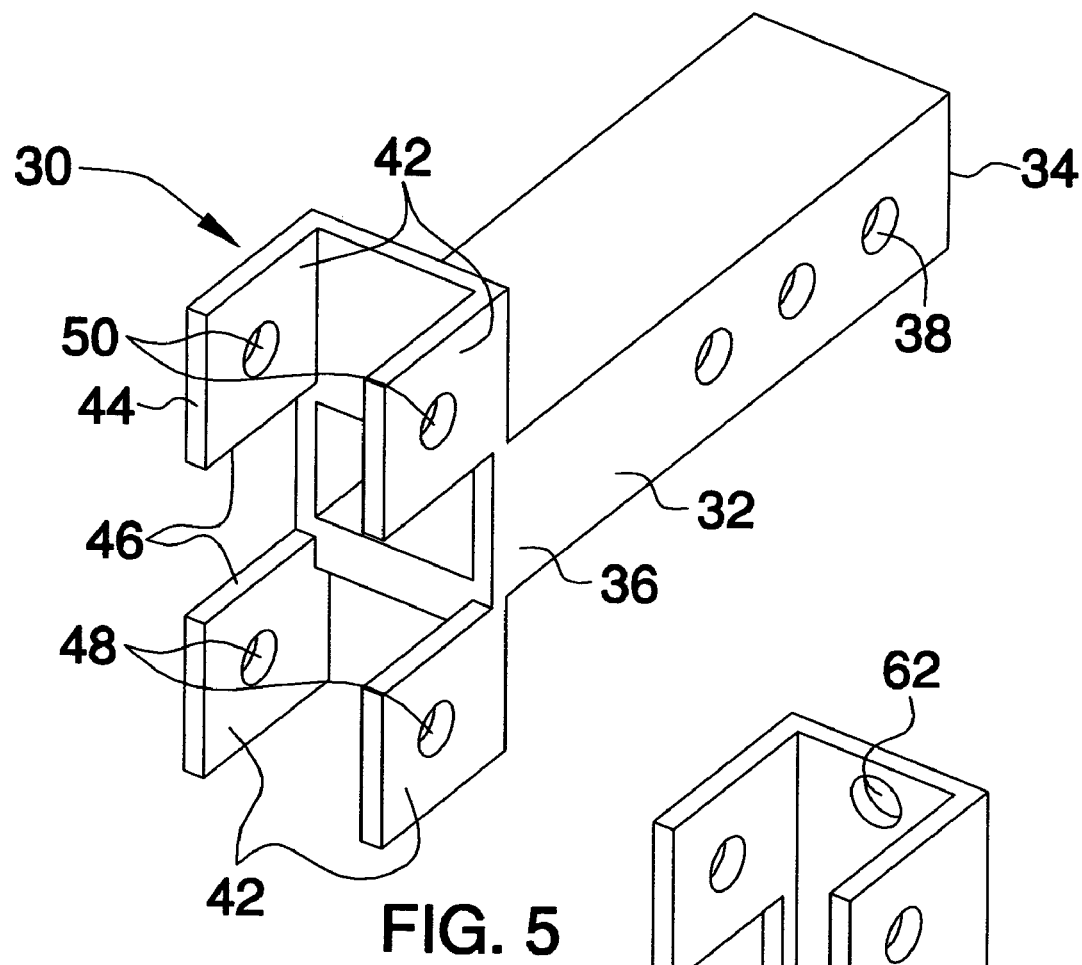
FIG. 5 is a perspective view of a first embodiment connector of the present invention.
Figure 6:
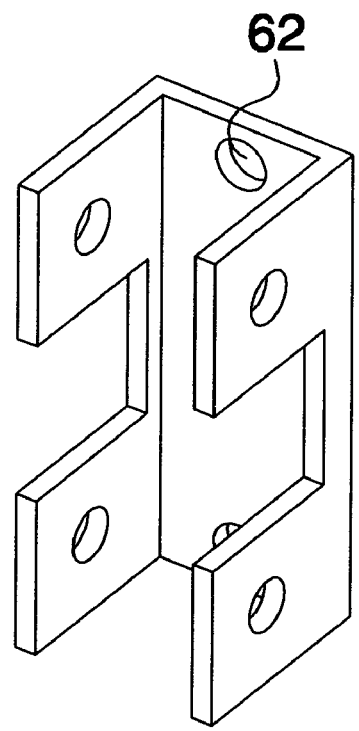
FIG. 6 is a perspective view of a second embodiment connector of the present invention.

With reference now to the drawings, and in particular to FIGS. 1 through 6 thereof, a new truck guard device embodying the principles and concepts of the present invention and generally designated by the reference numeral 10 will be described.

As best illustrated in FIGS. 1 through 6, the truck guard assembly 10 generally comprises a conventional semi-truck 12 that has a front end 14 and a pair of female hitch receivers 16 that are mounted on the front end 14 and are spaced from each other. The female hitch receivers 16 are conventional for semi-trucks though it should be understood that the female hitch receivers 16 are not required for the instant invention.

A shield apparatus 20 includes a plurality of elongated members 22 each having a first end 24 and a second end 26. A plurality of connector bars 28 are attached to each of the elongated members 22 so that the elongated members 22 are each orientated parallel to each other. The elongated members 22 each have a length generally between 7.5 feet and 8.5 feet and each of the elongated members 22 has a pair of bends 30 therein. Each of the bends 29 is positioned generally adjacent to a respective one of the first 24 and second 26 ends. The elongated members 22 may have additional bends therein depending on the shape of the front end 14 of the semi-truck 12. A distance from a top one of the elongated members 22 to a bottom one of the elongated members 22 is generally between 30 inches and 40 inches. There are preferably at least four elongated members 22. The connector bars 28 are each preferably vertically mounted when the elongated members 22 are horizontally orientated.

A pair of connectors 30 is provided and each is configured to releasably attaching the shield apparatus 20 to the front end 14 of the semi truck 12. Each of the connectors 30 is attached to the shield apparatus 20 and is positioned for engaging one of the hitch receivers 16.

Each of the connectors 30 includes a rod 32 that has a first end 34 and a second end 36. The rod 32 defines a male coupler and the first end 34 is removably extendable into one of the hitch receivers 16. The rod 32 has a plurality of apertures 38 extending therethrough. A bracket 40 is attached to the second end 36. The bracket 40 includes a pair of plates 42 attached to and extending away from the second end 36. The plates 42 are spaced from each other and are orientated parallel to each other. Each of the plates 42 has an outer edge 44 facing away from the rod 32. Each of the outer edges 44 has a slot 46 therein. One of the elongated members 22 is positionable in the slot 46. Each of the plates 42 has a first opening 48 and a second opening 50 extending therethrough and each of the first openings 48 is positioned below the slots 46. The second openings 50 are positioned above the slots 46.

A plurality of securing posts is provided for attaching the rod 32 to the female hitch receiver and the bracket to the shield apparatus 22. A first 52 of the securing posts is removably extendable through one of the hitch receivers 14 and an aligned one of the apertures 38. A second 54 of the securing posts extends through the first openings 48 and one of the connector bars 28 so that the plates 42 are hingedly coupled to the shield apparatus 20. A third 56 of the securing posts is removably extendable through the second openings 50 and into the connector bar 28 having the second securing post 54 therein so that the elongated members 22 are horizontally orientated. A second embodiment 58, shown in FIGS. 3 and 6 includes a connector that only includes a bracket 60 that is attachable directly to the semi-truck by fasteners extendable through bracket holes 60 and does not include the rod 32.

In use, the shield apparatus 20 is attached to a semi-truck 12 as described above. When the engine compartment must be accessed and the top of the truck tilted, the third securing post 56 may be removed to allow for the shield apparatus 20 to tilt away from the semi-truck 12. The shield apparatus 20 protects the front of the semi-truck 12 from any impact damage. The brackets 40 are preferably attached to the shield apparatus 20 nearer to the bottom one than the top one of the elongate members 22.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary guard assembly for a semi-truck, the semi-truck having a front end, a pair of female hitch receivers being mounted on the front end and being spaced from each other, said assembly comprising:
    a shield apparatus including a plurality of elongated members each having a first end and a second end, a plurality of connector bars being attached to each of said elongated members such that said elongated members are each orientated parallel to each other; and
    a pair of connectors configured to releasably attach said shield apparatus to said front end of said semi truck, each of said connectors being attached to said shield apparatus and being positioned for engaging the front end, each of said connectors including:
        a rod having a first end and a second end, said rod defining a male coupler and said first end being removably extendable into one of said female hitch receivers, said rod having a plurality of apertures extending therethrough;
        a bracket being attached to said second end and being hingedly coupled to said shield apparatus.

2. The assembly according to claim 1, wherein each of said elongated members each has a length generally between 7.5 feet and 8.5 feet.

3. The assembly according to claim 2, wherein each of said elongated members has a pair of bends therein, each of said bends being positioned generally adjacent to a respective one of said first and second ends.

4. The assembly according to claim 3, wherein a distance from a top one of said elongated members to a bottom one of said elongated members being generally between 30 inches and 40 inches.

5. The assembly according to claim 2, wherein a distance from a top one of said elongated members to a bottom one of said elongated members being generally between 30 inches and 40 inches.

6. The assembly according to claim 1, wherein each of said connectors further includes:
    said bracket including a pair of plates being attached to and extending away from said second end, said plates being spaced from each other and being orientated parallel to each other, each of said plates having an outer edge facing away from said rod, each of said outer edges having a slot therein, one of said elongated members being positioned in said slot, each of said plates having a first opening and a second opening extending therethrough, each of said first openings being positioned below said slots, each of said second openings being positioned above said slots; and
    a plurality of securing posts, a first of said securing posts being removably extendable through one of said female hitch receivers and an aligned one of said apertures, a second of said securing posts extending through said first openings and one of said connector bars such that said plates are hingedly coupled to said shield apparatus, a third of said securing posts being removably extendable through said second openings and into said connector bar having said second securing post therein such that said elongated members are horizontally orientated.

7. An auxiliary guard assembly for a semi-truck, said assembly comprising:
    a semi-truck having a front end, a pair of female hitch receivers being mounted on said front end and being spaced from each other;
    a shield apparatus including a plurality of elongated members each having a first end and a second end, a plurality of connector bars being attached to each of said elongated members such that said elongated members are each orientated parallel to each other, said elongated members each having a length generally between 7.5 feet and 8.5 feet, each of said elongated members having a pair of bends therein, each of said bends being positioned generally adjacent to a respective one of said first and second ends, a distance from a top one of said elongated members to a bottom one of said elongated members being generally between 30 inches and 40 inches;
    a pair of connectors configured to releasably attaching said shield apparatus to said front end of said semi truck, each of said connectors being attached to said shield apparatus and being positioned for engaging one of said female hitch receivers, each of said connectors including;
        a rod having a first end and a second end, said rod defining a male coupler and said first end being removably extendable into one of said female hitch receivers, said rod having a plurality of apertures extending therethrough;
        a bracket being attached to said second end, said bracket including a pair of plates being attached to and extending away from said second end, said plates being spaced from each other and being orientated parallel to each other, each of said plates having an outer edge facing away from said rod, each of said outer edges having a slot therein, one of said elongated members being positioned in said slot, each of said plates having a first opening and a second opening extending therethrough, each of said first openings being positioned below said slots, each of said second openings being positioned above said slots; and a plurality of securing posts, a first of said securing posts being removably extendable through one of said female hitch receivers and an aligned one of said apertures, a second of said securing posts extending through said first openings and one of said connector bars such that said plates are hingedly coupled to said shield apparatus, a third of said securing posts being removably extendable through said second openings and into said connector bar having said second securing post therein such that said elongated members are horizontally orientated.

* * * * *